(12) United States Patent
Rollins

(10) Patent No.: US 6,321,918 B1
(45) Date of Patent: Nov. 27, 2001

(54) MODULAR SHELVING SYSTEM

(76) Inventor: Eric James Rollins, 162 Wall St., Sonora, CA (US) 95370

( * ) Notice: Subject to any disclaimer, the term of this patent is extended or adjusted under 35 U.S.C. 154(b) by 0 days.

(21) Appl. No.: 09/302,975

(22) Filed: Apr. 30, 1999

(51) Int. Cl.⁷ .................................................. A47G 29/00
(52) U.S. Cl. ............................... 211/40; 211/43; 211/194
(58) Field of Search .................................... 211/34, 36, 37, 211/40, 41.1, 41.12, 41.2, 42, 43, 186, 188, 194; D6/407; 52/591.3, 591.5; 312/111; 446/125

(56) References Cited

U.S. PATENT DOCUMENTS

| 834,486 | * | 10/1906 | Noonan | 211/40 |
| 1,120,941 | * | 12/1914 | Jones | 211/40 X |
| 2,680,698 | * | 6/1954 | Schnee | 52/591.3 X |
| 2,922,527 | * | 1/1960 | Finn | 211/40 |
| 3,657,852 | * | 4/1972 | Worthington et al. | 52/591.3 |
| 3,977,527 | * | 8/1976 | Rose et al. | 211/46 |
| 4,196,812 | * | 4/1980 | McInnis | 211/40 |
| 4,232,916 | * | 11/1980 | Correia | 312/107 |
| 4,558,649 | | 12/1985 | Petersen . | |
| 4,742,922 | * | 5/1988 | Demarest, Jr. | 211/43 |
| 5,279,232 | | 1/1994 | Gollick . | |
| 5,415,297 | * | 5/1995 | Klein et al. | 211/40 |
| 5,421,467 | | 6/1995 | Dittborn . | |
| 5,695,081 | | 12/1997 | Alkalay . | |
| 5,722,544 | | 3/1998 | Williams . | |
| 5,762,208 | * | 6/1998 | Yeh | 211/40 |
| 5,788,088 | | 8/1998 | Kao . | |
| 5,791,265 | | 8/1998 | Ellsworth et al. . | |
| 5,971,165 | * | 10/1999 | Levins | 211/43 |

OTHER PUBLICATIONS

Boltz–USA, CD330 Etc., http://www.boltz–usa.com.
Space Control, CD Racks, http://www.thespacecontrol.com.

* cited by examiner

Primary Examiner—Daniel P. Stodola
Assistant Examiner—Jennifer E. Novosad
(74) Attorney, Agent, or Firm—Richard R. Batt

(57) ABSTRACT

A modular shelving system has a first wall and a second wall. Extending between the first wall and the second wall is a plurality of rigid bridging members. Each of the walls has a base panel and a detachably connected ancillary panel. An upper profile of the base panel and a lower profile of the ancillary panel vertically interlock to form an interface. A plurality of apertures is formed along the interface when the panels are interlocked. A fastener, such as a screw, can be inserted through each of the plurality of apertures to detachably connect one of the walls to one of the plurality of bridging members. Additional walls and bridging members may be provided to form additional storage modules. Each wall may also be heightened by adding ancillary panels to form a highly accommodating expandable shelving system.

16 Claims, 6 Drawing Sheets

MODULAR SHELVING SYSTEM

BACKGROUND OF THE INVENTION

1. Technical Field

The present invention is directed to a shelving system and in particular, to a modular shelving system capable of being readily assembled and disassembled.

2. Description of Related Art

Various types of modular shelving systems have been disclosed to the public for storing articles. Many modular shelving systems have stackable modular units. Examples of stackable shelving systems are shown in U.S. Pat. Nos. 5,421,467; 5,788,088 and 5,791,265. U.S. Pat. No. 5,421,467 describes stackable modular units each having first and second support members in parallel to one another with a continuously positionable shelf The modular units may be stacked wherein mating upper and lower stacking surfaces of the support members abut. U.S. Pat. No. 5,788,088 also describes a stackable rack. The tower-like rack described in U.S. Pat. No. 5,788,088 has a base body, three columns, and a plurality of support plates for individually supporting compact disk boxes. Yet another stackable shelving system is described in U.S. Pat. No. 5,791,265. The shelving system in U.S. Pat. No. 5,791,265 includes open-sided frames stacked together to form columns. The columns have a guide opening which receives a shelving element thereby locking the stacked frames together.

In addition to generally stackable shelving systems, other shelving systems can be extended laterally as well as vertically. Typically, extendable modular units are connected or repeated in the direction of shelving support members. An example of a modular extendable shelving system is shown in U.S. Pat. No. 5,695,081 where the system comprises interconnecting vertical posts, horizontal beams, side horizontal braces, coupling connectors, and horizontal shelf pieces positioned on the horizontal beams.

U.S. Pat. No. 5,279,232 describes another extendable shelving assembly having two substantially upright side panels each having holes through their surfaces. Shelf-support members extend between the side panels. The shelving assembly can be repeated in the direction of the shelf-support members for the entire length of a wall.

U.S. Pat. No. 5,722,544 shows yet another extendable shelving system including modular base units connected with binder clips. Each modular base unit further has at least two shelving units interconnected with vertical support posts.

There is still a need, however, for a modular shelving system that is easy to assemble and expandable in both the vertical and horizontal directions. There is also a need for a modular shelving system that is readily assembled yet securely connected so as to prevent displacement between its components.

SUMMARY OF THE INVENTION

A modular shelving assembly is provided and includes a substantially vertical first wall; a second wall parallel to the first wall wherein each of the first wall and the second wall has a base panel and an ancillary panel. The base panel comprises an upper profile and the ancillary panel comprises a lower profile adapted to vertically interlock with the upper profile of the base panel. An interface and a plurality of apertures is formed where the upper and lower profiles interlock. The shelving system further has at least one bridging member. The bridging member extends between the first wall and the second wall and can be detachably connected to the first wall with a fastener extending through one of the plurality of apertures.

The modular shelving system may further be expanded along the length of a wall by adding additional walls interconnected with additional bridging members. The modular shelving system may also be heightened by connecting additional ancillary panels to each of the walls.

DETAILED DESCRIPTION OF THE INVENTION

Figure 1:
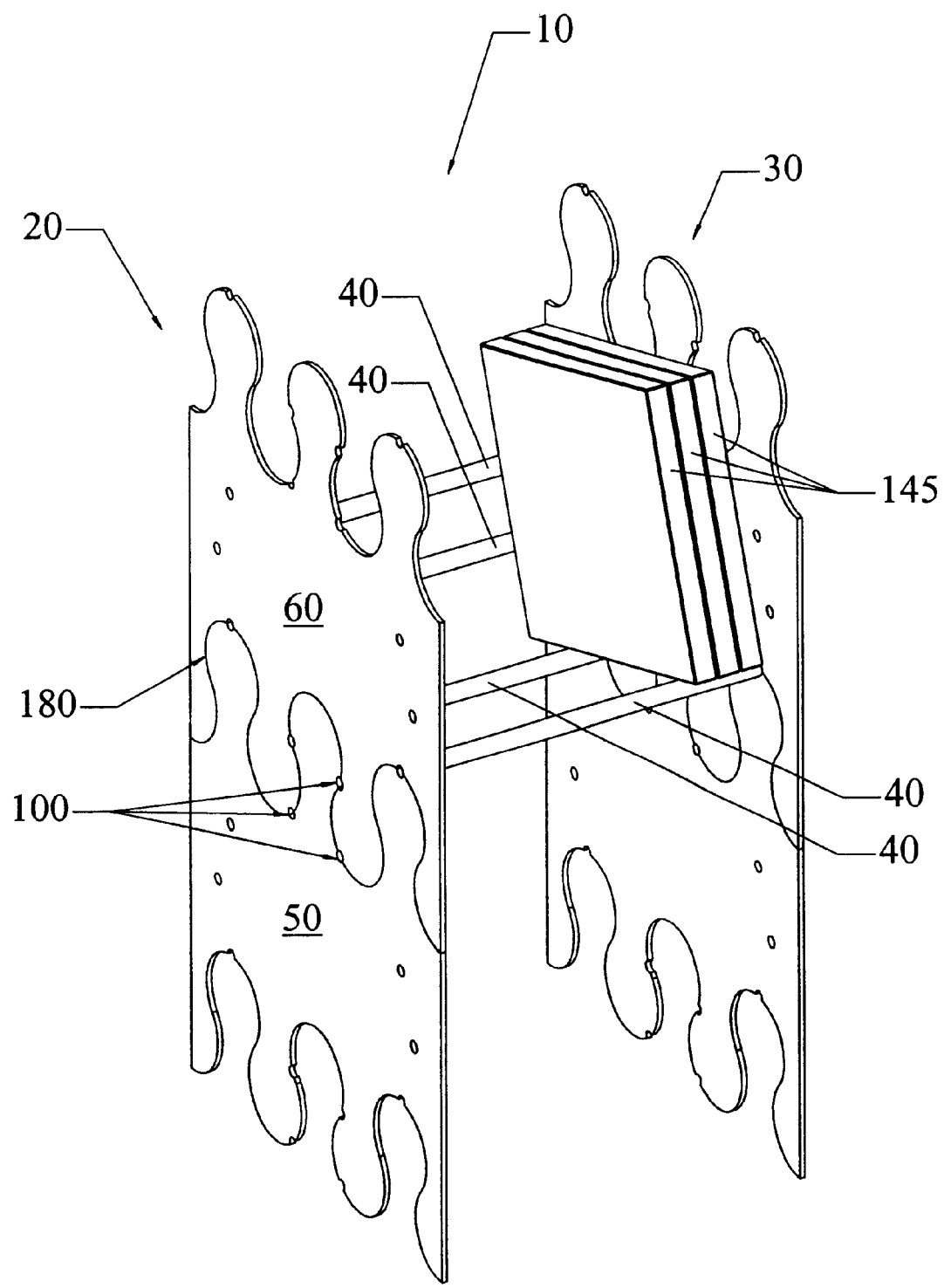
FIG. 1 is an isometric view of a preferred embodiment of the invention illustrating an application.

FIG. 1 shows a preferred embodiment of the present invention. In FIG. 1, a shelving assembly 10 is shown having a first wall 20 and a second wall 30. Each wall is substantially upright and substantially flat. The walls are preferably made from aluminum but other materials may be used. The walls may have a clear anodized finish. The walls are shaped by conventional fabrication techniques including but not limited to metal stamping.

Extending between the walls are a plurality of bridging members 40. Bridging members 40 are preferably made from a rigid material such as, for example, aluminum. The bridging or horizontally disposed member may also be made from a transparent material. Bridging members 40 serve at least two functions. First, bridging members 40 support articles 145. While articles 145 are shown as standard-sized compact disk cases, other articles can be shelved on bridging members 40. Preferable articles include but are not limited to compact disks, digital video disks, floppy disks, tapes, and books. The bridging members can also have various cross sections. For example, a rectangle may be a suitable cross section for a bridging member so long as its surface is capable of supporting certain articles. Further, a single bridging member can be used rather than a plurality of bridging members 40.

Figure 2A:
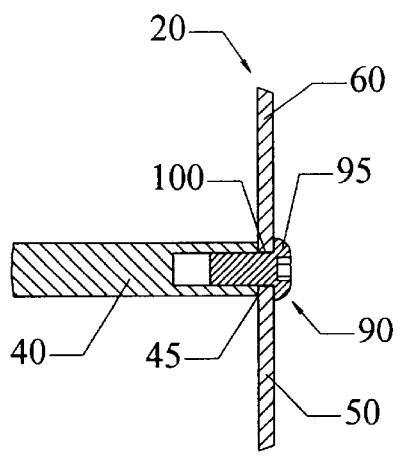
FIG. 2A is a partial, cross sectional, detail view of the embodiment shown in FIG. 1 and its method of fastening.
Figure 2B:
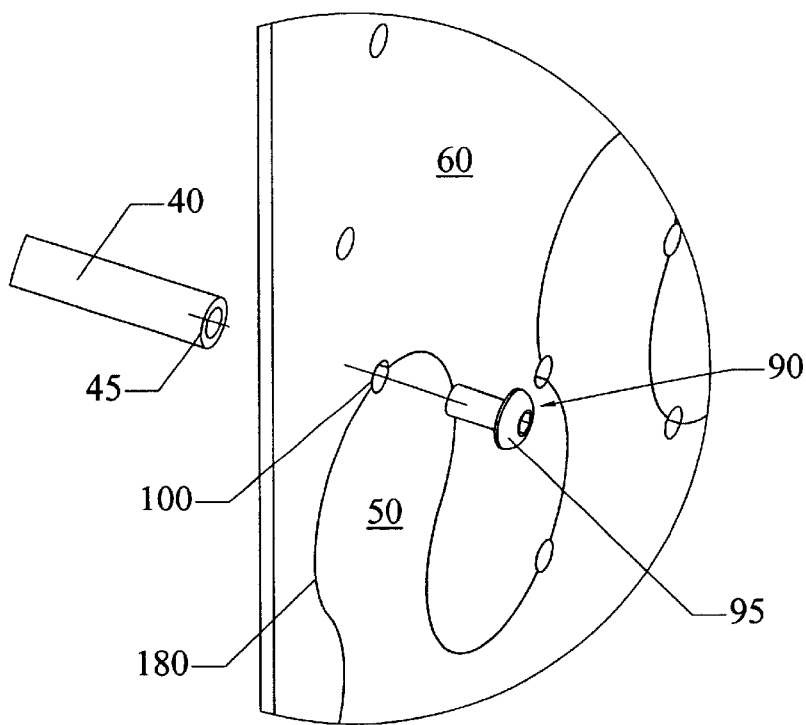
FIG. 2B is an exploded view of FIG. 2A.
Figure 3:
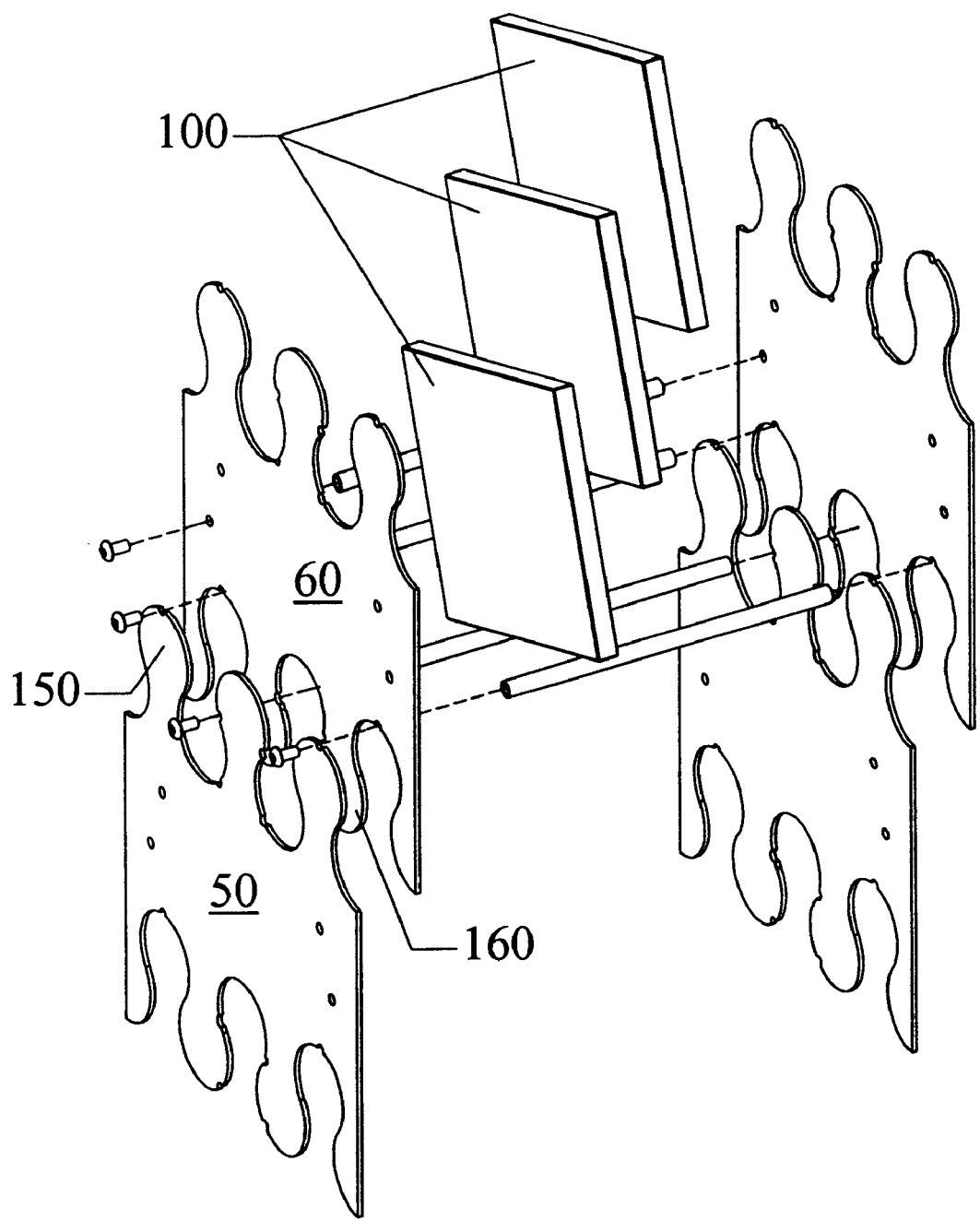
FIG. 3 is an exploded view of the embodiment shown in FIG. 1.

A second function of bridging members 40 is to firmly connect shelving system 10. As illustrated in FIG. 2A and FIG. 2B, a portion of base panel 50 and ancillary panel 60 are clamped between one of bridging members 40 and a fastener 90. The fastener 90 extends through an aperture 100 and connects with an end of one of bridging members 40. For clamping to be effective, apertures 100 must have a diameter less than the outer diameter of end 45 of the bridging members 40 as well as a diameter less than the outer diameter of the head 95 of fastener 90. While the embodiment shown in FIGS. 1–3 shows a circular aperture, other shaped opening can be used. It should also be noted that while fastener 90 can be a screw or rivet, other suitable fasteners may be employed. Alternatively, base panel 50 to ancillary panel 60 may be held in place with binding or C-shaped clips. The binder clips clamp onto both base panel 50 and ancillary panel 60, holding the panels in alignment. The binder clips may be made from a resilient or flexible material.

Though the clamping action, described above, imposes a frictional force which inherently limits vertical displacement of base panel 50 from ancillary panel 60, secure vertical locking is primarily achieved due to the shape of base panel 50 and ancillary panel 60. As illustrated in FIG. 3, base panel 50 has a shaped upper profile 150 and ancillary panel 60 has a shaped lower profile 160. Upper profile 150 and lower profile 160 are matching or mating. Where the matching profiles interlock, an interface 180 is formed as shown in FIG. 1. Upper profile 150 and lower profile 160 fit together similar to jigsaw-puzzle pieces and once positioned together, cannot be pulled apart if held in the same plane. Like a jigsaw puzzle, the shape of the upper profile 150 and lower profile 160 can be smoothly curved or jagged so long as the two profiles interlock. It should also be noted that each of the first wall 20 and second wall 30 may often be in an upright or vertical position. Even if the panels are not substantially vertical, however, the panels can still be interlocked as long as the panels are positioned together in the same plane.

Figure 4:
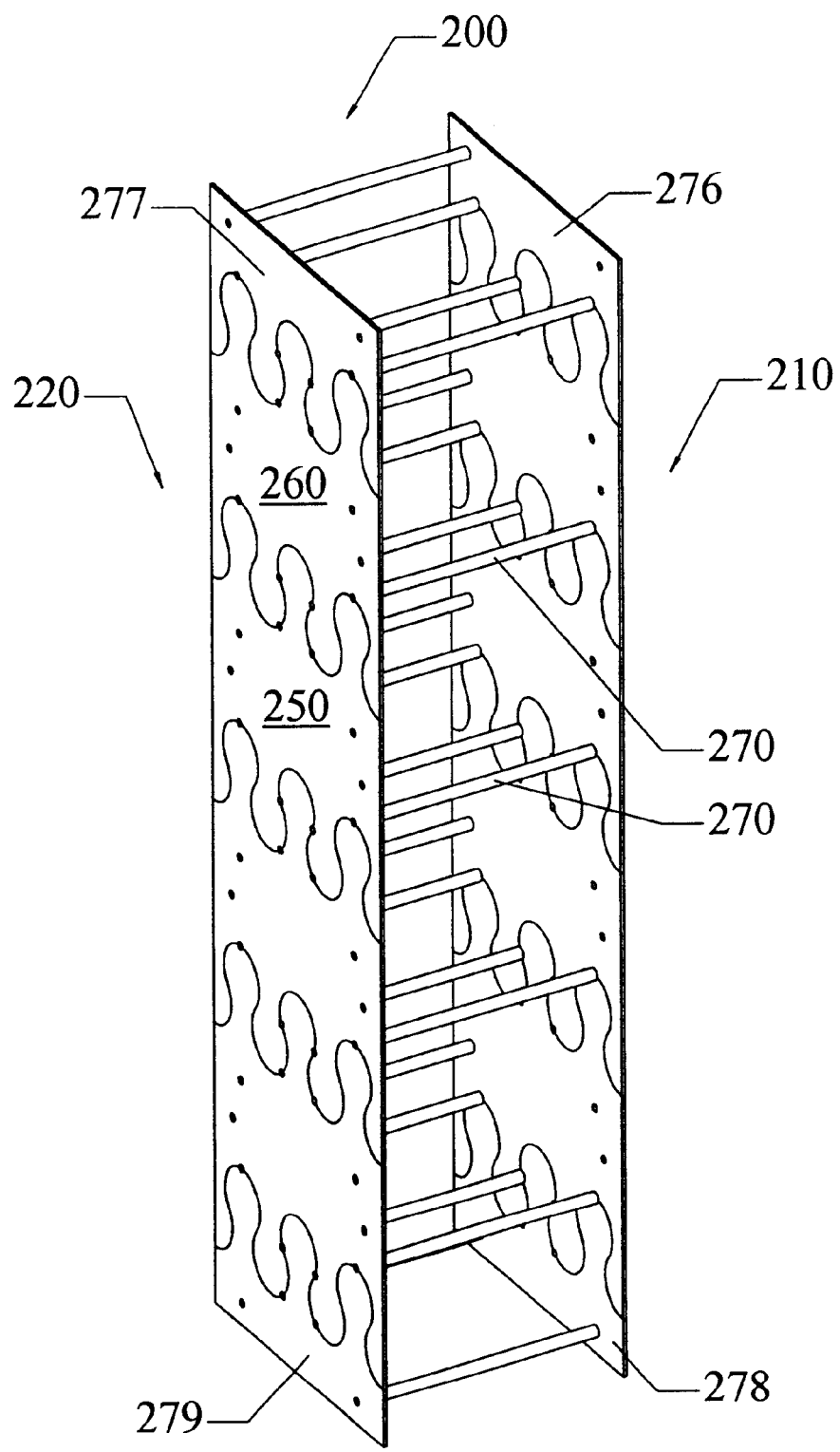
FIG. 4 is an isometric view of another embodiment of the invention.

FIG. 4 shows another embodiment of the present invention. The shelving system 200 is similar to shelving system 10 described in FIG. 1 except that each wall 210, 220 has two additional panels 250, 260. Additional bridging members 270 are provided to maintain a secure connection between additional panels 250, 260. The additional bridging members 270 provide the advantage of enabling extension of the shelving system vertically, increasing storage capacity of the shelving system.

Top panels 276, 277 are shown attached to the tops walls 210, 220. Likewise, bottom panels 278, 279 can be attached to the base panels of walls 210, 220. The bottom panels 278, 279 provide enhanced stability of shelving system 200.

Figure 5:
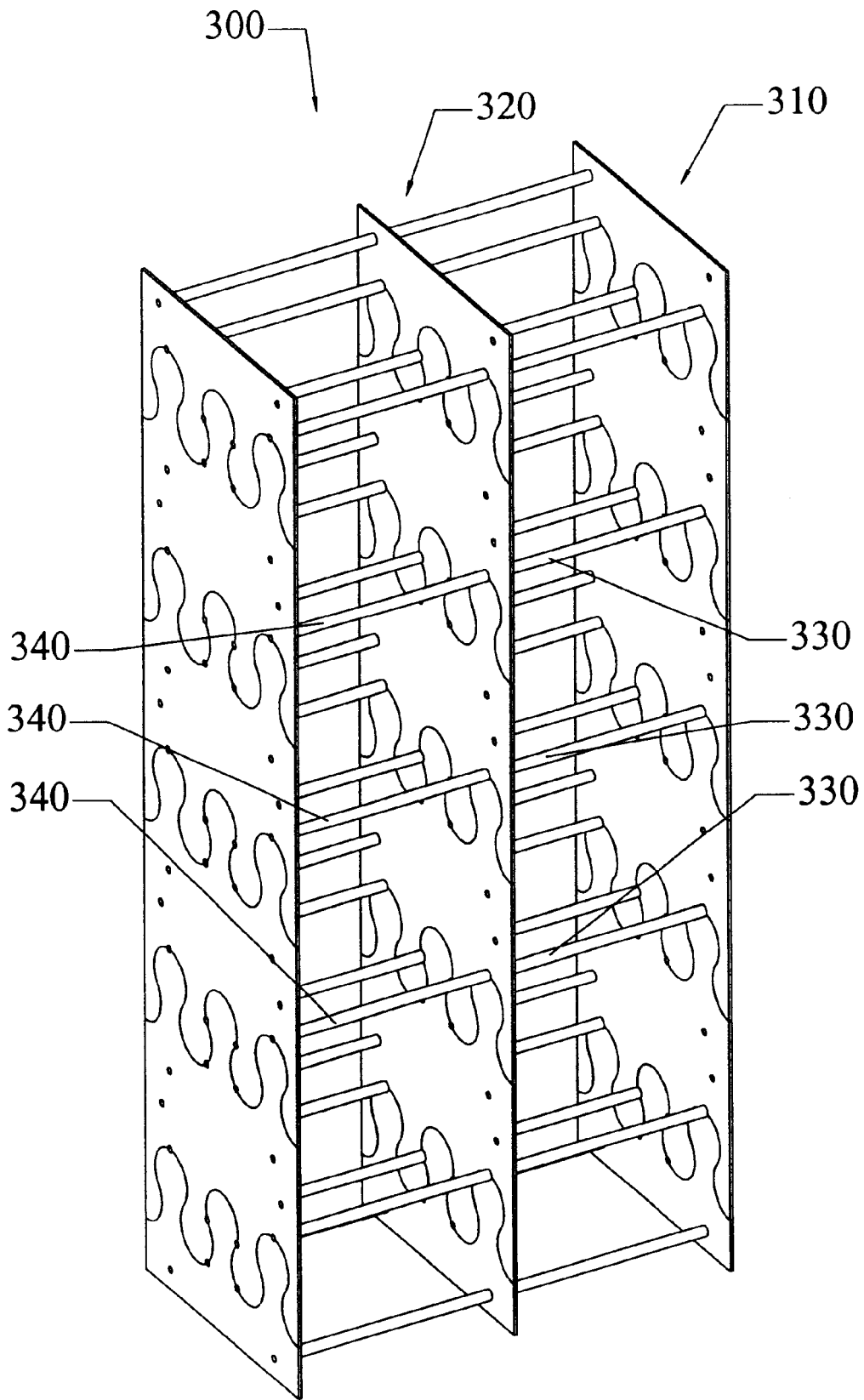
FIG. 5 is an isometric view of another embodiment of the invention.

FIG. 5 illustrates yet another embodiment of the present invention. In FIG. 5, shelving system 300 is essentially the same as the shelving system 200 described in FIG. 4 except that a third wall 310 is provided. Third wall 310 is secured to second wall 320 with additional bridging members 330. Note that the base and ancillary panels of second wall 320 are fastened together between rigid bridging members 330 and 340 and not, as shown in FIG. 2B, between a rigid bridging member 40 and head 95 of fastener 90. Shelving system 300, therefore, has an additional advantage of extending horizontally as well as vertically over the shelving system 10 shown in FIG. 1. Extending the shelving system horizontally as well as vertically increases the storage capacity.

Figure 6:
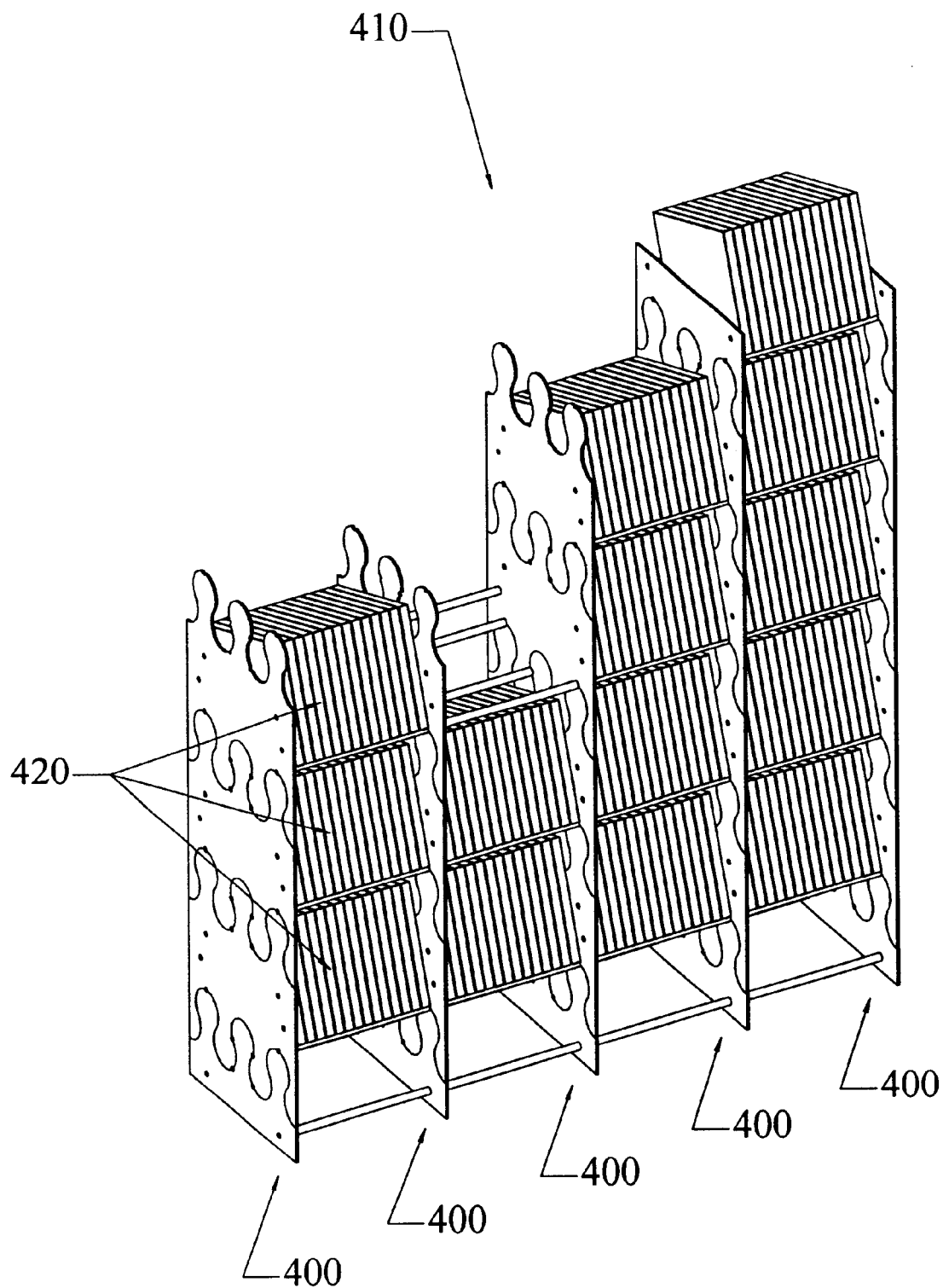
FIG. 6 is an isometric view of yet another embodiment of the invention illustrating an application.

While the walls shown in FIG. 5 have identical heights, each wall in the present invention is not required to have the same height. As illustrated in FIG. 6, each of the walls 400 are not equal in height. Shelving system 410 can therefore be built to accommodate a wide range of spatial restrictions yet still provide maximum storage capabilities. As illustrated by the embodiment shown in FIG. 6, over 200 articles can be stored. The number of articles 420, however, may be changed by building more or less article storage modules.

While the above description and drawings provide specific embodiments of the invention, the present invention is not intended to be limited to those particular forms. Rather, the invention is intended to cover all modifications and equivalents falling within the scope of the following claims.

I claim:

1. A modular shelving system comprising:
   a substantially upright first wall;
   a second wall substantially parallel to the first wall wherein each of the first wall and the second wall has a base panel and an ancillary panel, the base panel comprising an upper profile and the ancillary panel comprising a lower profile adapted to interlock with the upper profile of the base panel forming a nonoverlapping interface;
   at least one aperture formed along the interface when the base panel is interlocked with the ancillary panel; and
   at least one rigid bridging member extending between the first wall and the second wall wherein the at least one bridging member is detachably connected to the first wall with a fastener through the at least one aperture of the first wall.

2. The modular shelving system as recited in claim 1 wherein the at least one rigid bridging member is a rod.

3. The modular shelving system as recited in claim 2 wherein the base panel and the ancillary panel are aluminum.

4. The modular shelving system as recited in claim 1 wherein each of the upper profile and lower profile are smoothly curved.

5. The modular shelving system as recited in claim 1 wherein the fastener is threaded.

6. The modular shelving system as recited in claim 1 further comprising a substantially flat third wall in parallel to the second wall and having at least one bridging member disposed therebetween.

7. The modular shelving system as recited in claim 1 wherein each of the first wall and the second wall further comprises a third panel having a lower profile adapted to interlock with an upper profile of the ancillary panel of each of the first wall and second wall.

8. The modular shelving system as recited in claim 7 wherein the base panel and the ancillary panel are identical in shape in each of the first wall and second wall.

9. A modular shelving system comprising:
   a first wall and a second wall, each of the first wall and the second wall having a base panel and an ancillary panel in the same plane as the base panel, the base panel being of uniform thickness and comprising an upper profile and the ancillary panel being of uniform thickness and comprising a lower profile removably engaged with the upper profile of the base panel said upper profile and said lower profile configured such that movement of one of the base panel and the ancillary panel in a direction parallel to the same plane as the base panel is restricted and movement of one of the base panel and the ancillary panel in a direction perpendicular to said plane is unrestricted;
   a securing means to secure the base panel to the ancillary panel in the direction perpendicular to said plane in each of the first wall and second wall; and a plurality of bridging members extending between the first wall and the second wall.

10. The shelving system as recited in claim 9 wherein the base panel and the ancillary panel are nonoverlapping.

11. The shelving system as recited in claim 9 wherein the securing means is a screw.

12. A modular storage assembly for storing disks comprising:
    a first storage container;
    a second storage container, the second storage container being vertically aligned over the first storage container, each of the first storage container and the second storage container having opposite walls and each of the opposite walls having an upper surface and a lower surface, the upper surface being adapted to removably engage with the lower surface and wherein the lower surface and the upper surface are nonoverlapping when the opposite walls of each of the first storage container and the second storage container are removably engaged; and at least one horizontally disposed member engaged to the opposite walls such that the at least one horizontally disposed member prevents horizontal movement between the first storage container and the second storage container when the first storage container is removably engaged to the second storage container.

13. The modular storage assembly as recited in claim 12 wherein the at least one horizontally disposed member is rigid.

14. The modular storage assembly as recited in claim 13 wherein the at least one horizontally disposed member is straight.

15. The modular storage assembly as recited in claim 13 wherein the at least one horizontally disposed member is made from a transparent material.

16. The modular storage assembly as recited in claim 13 wherein the opposite walls of the first storage module have a clear anodized finish.

* * * * *